United States Patent [19]

Friswell

[11] Patent Number: 4,707,452
[45] Date of Patent: Nov. 17, 1987

[54] LABORATORY EVAPORATION

[75] Inventor: David R. Friswell, Holliston, Mass.

[73] Assignee: Zymark Corporation, Hopkinton, Mass.

[21] Appl. No.: 665,456

[22] Filed: Oct. 26, 1984

[51] Int. Cl.$^4$ .......................... B01D 1/14; B01L 11/00
[52] U.S. Cl. ..................................... 436/177; 436/181; 422/101; 159/16 R; 159/16.1
[58] Field of Search .................. 422/62, 101; 436/147, 436/177, 181; 203/2, 3; 159/16 R

[56] References Cited

U.S. PATENT DOCUMENTS

| | | | |
|---|---|---|---|
| 3,398,935 | 8/1968 | Livesey et al. | 366/101 |
| 3,588,053 | 6/1971 | Rothermel | 366/101 |
| 4,465,554 | 8/1984 | Glass | 422/101 |

Primary Examiner—Barry S. Richman
Assistant Examiner—Lynn M. Kummert
Attorney, Agent, or Firm—Andrew F. Kehoe

[57] ABSTRACT

An improved system for evaporating liquid to obtain solid residue where by small quantities of a solid are recovered from a first liquid medium and dissolved in another liquid medium. The invention comprises a receptacle for holding the liquid to be treated and structure which localizes entry of an evaporating, or carrier, gas along the wall of the receptacle as it moves downwardly and into contact with the material to be treated. Such localization of inlet gas also provides a relatively quiescent central zone in the receptacle through which exiting gas, carrying evaporated liquid, can be removed without disturbing the flow of inlet gas.

6 Claims, 3 Drawing Figures

LABORATORY EVAPORATION

BACKGROUND OF THE INVENTION

This invention relates to (a) novel processes for evaporating liquid from a chemical sample with drying gas, for like processes, and (b) and apparatus useful in such processes.

It is often desirable to transfer a solute from one solvent system to another solvent system. For example, this procedure is used frequently in liquid chromatography where a solution, perhaps a liquid fraction obtained from one chromatographic procedure, can be more specifically analyzed by use of a different solvent. In the past, it has been common to place the first solution into a tube and, using a gas sparge tube, or cannula, contact the solution with sufficient drying gas to remove the unwanted liquid.

A number of problems are associated with this procedure: The incoming gas flow tends to interfere with the outgoing gas flow and the efficiency of the process, including the uniformity of drying is reduced. This leads to imperfectly dried samples, excessive preparatory time, or both. In turn, these problems increase the probability of operator error and samples which are poorly prepared for further processing. Also, where substantial numbers of such operations are carried out, there is a tendency to pollute the air of a laboratory. All these problems are accentuated when one attempts to use relatively warmer, and hence more efficient, evaporating gas.

SUMMARY OF THE INVENTION

It is a principle object of the invention to provide a novel process whereby laboratory evaporation procedures are made more efficient by an improvement in the quality of the interface between the drying gas and material being treated.

It is a further object of the invention to provide a novel process whereby dried samples of excellent uniformity are provided rapidly.

Another object of the invention is to provide a superior process, and improved apparatus, for monitoring the quality of off-gases from a gas-purged vessel.

Still another object of the invention is to segregate, and thereby facilitate, the disposal of incoming drying gas from the gaseous effluent leaving an evaporator.

Other objects will be obvious to those skilled in the art on their reading of this application.

The above objects have been substantially achieved by construction of a sample-processing system comprising a receptacle for liquid being processed and gas feed means to supply carrier gas into the receptacle such that the gas follows a path downwardly along the receptacle wall until it reaches the material to be treated. This procedure serves to leave a relatively free central path in the receptacle through which the process gas, now laden with any material being evaporated, may proceed upwardly through the central portion of the volume enclosed by the walls of the receptacle. Because the gas leaving the receptacle is not much diluted by mixing with the incoming gas, it is more sensitive to analysis by any number of procedures. For example, it may be thermally evaluated for the "end point" of an evaporation step.

Thus one particularly advantageous analytical procedure, facilitated by the construction and operation of that part of the invention described above, is the use of a collection tube for removing the outgoing gases and mounting, on it or in it, a thermister for sensing the temperature of the offgas. Such a device, on sensing a rise in temperature of the offgas, would report the completion, or near completion, of the drying to a control means which would respond with an appropriate action. For example, it could shut off the drying gas, alarm an operator, or the like.

Another important advantage of the invention is that the advantageous flow pattern remains even over very substantial changes in the height of the liquid being processed within the tube.

In one advantageous mode of the invention, the receptacle will be tubular and will be equipped with a tube for supplying incoming gas. This outlet of the gas supply tube will be so arranged that it will provide a generally helical flow path along the interior wall of the tube until it reaches the material being treated. Thereupon, the outgoing gas will rise and exit a central outlet port which may be conveniently tied to an exhaust manifold.

In practice, it is comtemplated that a number of such evaporating units will share a single laboratory station. Each unit can, typically, consist of a drying tube, a closure means for the drying tube which would also form means to hold and position the inlet and outlet gas conduits. Each drying tube would be held in a thermostated stand and the closure members with the inlet and outlet conduit could be conveniently positioned on the stand also.

While the subject invention will probably be most useful in evaporative processes wherein a solid residue is left behind, it should be noted that it has a number of other uses. It could be used very effectively to sublimate solids from a mixture being treated. Such sublimation processes could use incoming gases of appropriate temperatures. It also is used very effectively to evaporate films of the to layer of non-miscible liquids in the tube. Finally, it could be used as a short-term gas-purge device, for example where nitrogen or argon might be used over a short period of time to preserve samples of a chemical before subsequent processing. In each case the assurance that the inlet flow would be efficiently conducted to the material being treated would be an important advantage.

It also should be noted that the apparatus, as illustrated below, is particularly useful in conjunction with robot means. A robot arm can be used to pick up a conduit-bearing closure from a storage shelf and place it into the test tube.

ILLUSTRATIVE EMBODIMENT OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

IN THE DRAWINGS

Figure 1:
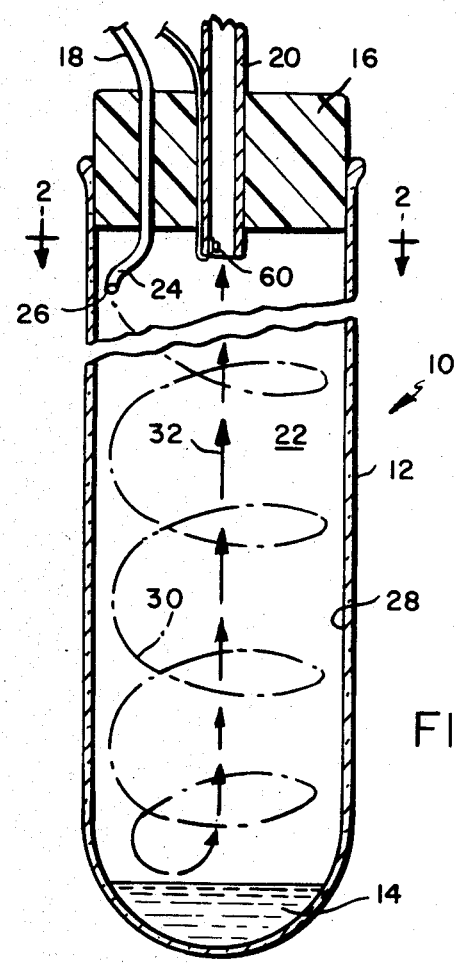
FIG. 1 is a perspective view, somewhat schematic, of an apparatus constructed according to the invention.
Figure 2:
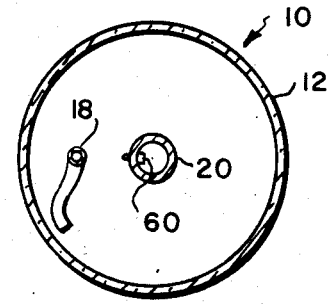
FIG. 2 is a view downwardly in an apparatus showing the position of the gas inlet conduit.

Referring to FIGS. 1 and 2, it is seen that the liquid-evaporating apparatus 10 comprises a test tube 12 forming a vessel for receiving a quantity of liquid 14 which comprises a solute dissolved therein. Tube 12 is equipped with a closure 16 through which gas inlet conduit 18 and outlet conduit 20 pass into the headspace 22 within tube 12 and above liquid 14.

Conduit 18, about 0.030 inches in inside diameter is arranged such that its terminal portion 24, and its discharge port 26 cause the gas to be discharged somewhat downwardly (preferably at an angle of from 10 to 50 angular degrees, but most advantageously at about 15 to 30 degrees) along the interior wall 28 of tube 12. As indicated schematically at 30, the gas flow from conduit 18 hugs the wall in a helical pattern until it reaches liquid 14 (or wet solid which gradually appears as its solvent is evaporated from the mass of liquid 14).

The motion of the inflowing gas induces a natural internal path for removal of moisture-carrying gas up to central portion of the test tube, as indicated at 32 of FIG. 1. A thermometer means 60 is mounted proximate to the outlet port 24 through which the drying gas leaves the tube.

Figure 3:
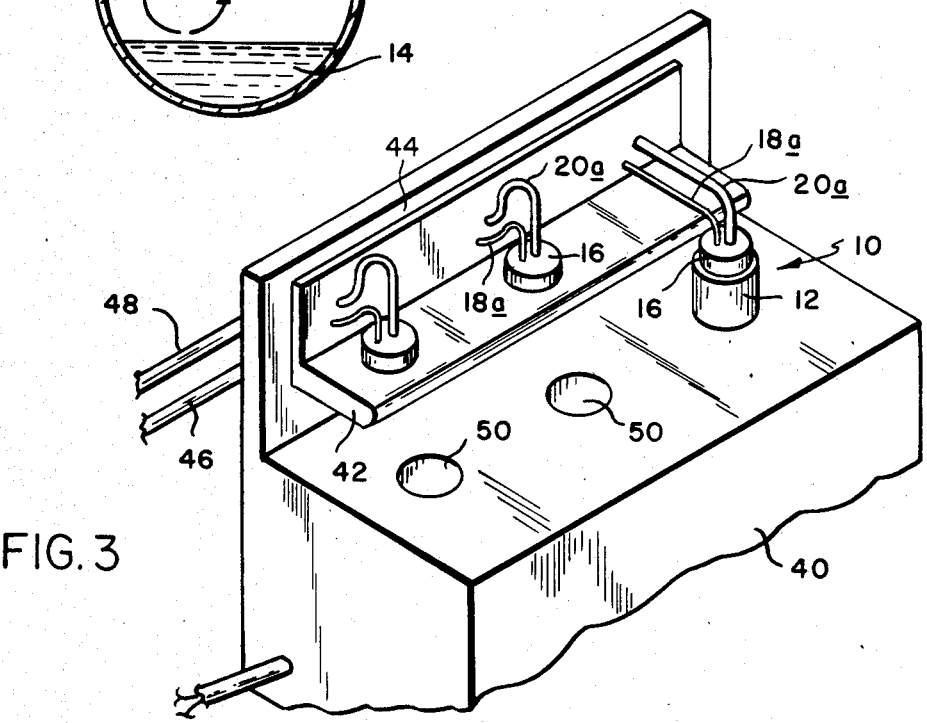
FIG. 3 is a perspective view, somewhat schematic, of a station comprising a number of apparatus described in FIG. 1.

FIG. 3 illustrates one convenient way to utilize the invention. Several of the apparatus 10 are utilized in conjunction with a central processing station 40. The closures 16 are kept on a shelf 42 with the necessary flexible conduits 18a and 20a extending, retracted, behind the facade 44 to manifolds 46 and 48 respectively. The test tube holding receptors 50 in station 40 are desirably thermostated electrically in a "dry" heat bath, e.g. an aluminum block.

It is also to be understood that the following claims are intended to cover all of the generic and specific features of the invention herein described and all statements of the scope of the invention which might be said to fall therebetween.

What is claimed is:

1. A process for recovering solids from liquids by evaporating said liquid until said solids have been converted to a solid composition of a desired state of dryness, said process comprising the steps of:
   (a) placing a liquid composition containing said solids and said liquid in a tubular receptacle;
   (b) causing drying gas to flow into said receptacle through an inlet to said tubular receptacle which inlet directs the flow of said drying gas in a generally helical flow pattern from a position in said tubular receptacle which is remote from said liquid composition around and downwardly along the wall of said tubular receptacle and thence into intimate contact with said liquid composition, to remove moisture therefrom; and
   (c) then removing moisture-bearing drying gas through an internal path, generally within said helical flow gas pattern of said incoming drying gas, and through an outlet conduit positioned at the axis of said helical flow pattern and near the top of said tubular receptacle, thereby avoiding dilution of said moisture bearing drying gas being removed by said incoming drying gas and maintaining a significant temperature difference between the incoming drying gas and the moisture-hearing drying gas being removed during said evaporating process.

2. A process as defined in claim 1 wherein said helical flow pattern is initiated at an angle of from about 10 to 50 angular degrees downwardly from horizontal.

3. A process as defined in claim 2 wherein said helical flow pattern is initiated at an angle of from about 15 to 30 degrees downward from horizontal.

4. Apparatus for isolating solids from liquids by evaporating said liquid, said apparatus comprising:
   (1) a tubular vessel having an opening only at the top thereof and forming means to hold a liquid composition to be dried to a suitably dry state near the bottom thereof;
   (2) a closure means closing said opening;
   (3) a first supply conduit means through said closure means and positioned near the top of said vessel for conveying drying gas through said opening into said tubular vessel in a helical path along the interior wall thereof and into contact with said composition being dried;
   (4) a second conduit means located in said closure means at a location on the axis of said helical path to remove said drying gas after it has contacted said composition being dried; and
   (5) each said conduit means accessing said tubular vessel at said opening thereby together forming a means to avoid excessive dilution of incoming gas by gas being removed from said vessel.

5. Apparatus as defined in claim 4 wherein said tubular vessel is a test tube.

6. Apparatus as defined in claim 5 wherein said first supply conduit means directs said incoming gas in a helical path at an angle of from about 15 to 30 angular degrees downwardly along said wall.

* * * * *